Sept. 17, 1968 W. S. SUTOWSKI 3,401,440
APPARATUS FOR ASSEMBLING BALL BEARING DEVICES
Original Filed Feb. 11, 1965 3 Sheets-Sheet 1
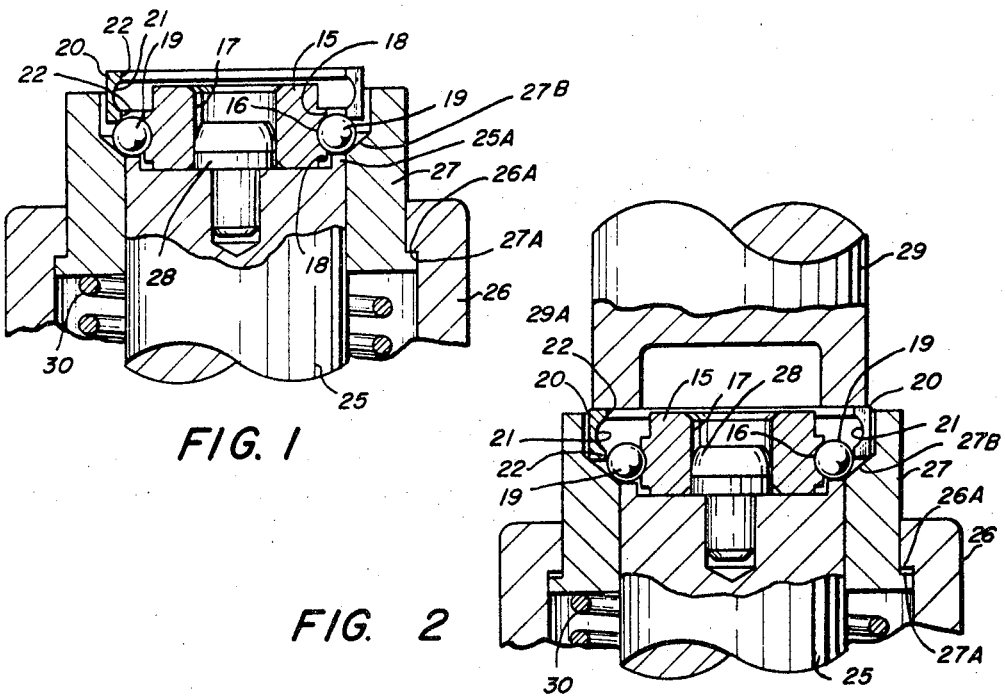
FIG. 1
FIG. 2
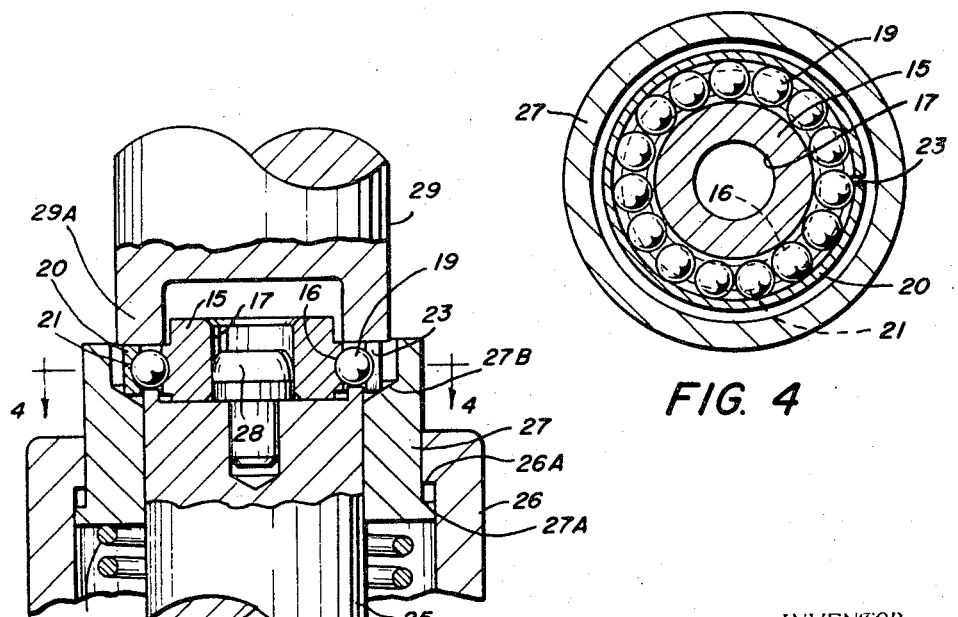
FIG. 3
FIG. 4
INVENTOR.
WALTER S. SUTOWSKI Sept. 17, 1968 W. S. SUTOWSKI 3,401,440
APPARATUS FOR ASSEMBLING BALL BEARING DEVICES
Original Filed Feb. 11, 1965 3 Sheets-Sheet 2

INVENTOR.
WALTER S. SUTOWSKI

INVENTOR.
WALTER S. SUTOWSKI

United States Patent Office 3,401,440
Patented Sept. 17, 1968

3,401,440
APPARATUS FOR ASSEMBLING BALL BEARING DEVICES
Walter S. Sutowski, 6976 Crestview Drive, Brecksville, Ohio 44141
Application Mar. 13, 1967, Ser. No. 622,720, now Patent No. 3,374,524, dated Mar. 26, 1968, which is a division of application Ser. No. 431,852, Feb. 11, 1965, now Patent No. 3,337,937, dated Aug. 29, 1967. Divided and this application Sept. 26, 1967, Ser. No. 670,698
5 Claims. (Cl. 29—201)

ABSTRACT OF THE DISCLOSURE

Apparatus for assembling a ball bearing device in which apparatus there are a nest structure having a central support for an inner race member, a shell concentrically mounted about the central support and having a funnel wall leading toward the central support for funneling the balls into a circle in the raceway of the inner race member on the central support, a collar concentrically mounted within the shell and about the central support, the collar being axially movable relative to the shell to be positionable about the balls in the raceway of the inner race member and to be withdrawn from about the balls, and a punch member for pressing the outer race member downwardly in axial alignment with the collar to replace the collar and to press the outer race member down and about the balls to expand the outer race member for clearing the balls until the raceway of the outer race member is opposite the raceway of the inner race member in which the balls are located and the outer race member contracts about the balls.

Related applications

This application is a division of my application Ser. No. 622,720 filed Mar. 13, 1967, now Patent No. 3,374,524 which in turn was a division of my application Ser. No. 431,852 filed Feb. 11, 1965, now United States Patent No. 3,337,937 issued Aug. 29, 1967.

My invention relates to improved apparatus for assembling ball bearing devices having a split outer race.

An object of my invention is the provision of improved apparatuses for assembling ball bearing devices having a split outer race resiliently biased toward contraction.

Another object is the provision for rapid and economical assembly of ball bearing devices wherein the outer race is resilient, such as of resilient steel, and which is biased toward contraction, that is, toward closing the gap between the opposed ends where the outer race is split.

Another object is the provision for improved automation in the rapid and economical assembly of ball bearing devices having a split outer race resiliently biased toward contraction.

Other objects and a fuller understanding of the invention may be had by referring to the following description and claims, taken in conjunction with the accompanying drawings, in which:

FIGURE 1 is a longitudinal sectional view taken through a preferred form of my apparatus and showing the parts in one stage of the assembly operation;

FIGURE 2 is a view similar to that of FIGURE 1 and showing the parts in a subsequent stage of the assembly operation;

FIGURE 3 is a view similar to that of FIGURES 1 and 2 and showing the parts in a still later stage of the assembly operation;

FIGURE 4 is a cross-sectional view taken through the line 4—4 of FIGURE 3;

Figure 5:
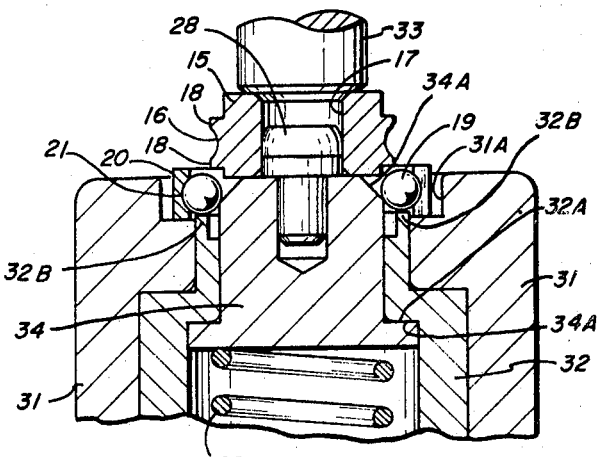
FIGURE 5 is a longitudinal sectional view of a modified form of apparatus illustrating another manner of assembling a ball bearing device having a split outer race resiliently biased toward contraction.

The bearing device illustrated in FIGURES 1 to 8, inclusive, is of the type having a single circle of balls in opposed single raceways of an inner race member and an outer race member. The inner race member 15 is of the non-split type and in the form illustrated has a bore 17 extending axially therethrough. The inner race member 15 has a raceway or annular groove 16 extending circumferentially therearound in the usual manner. The raceway 16 leaves lands or ridges 18 on opposite axial sides thereof which extend radially outward more than the bottom wall of the raceway 16.

There are a plurality of steel balls 19 arranged in a circle around the bearing device so as to freely revolve in the annular raceway 16. The bearing device has a split outer race member 20 which is of resilient steel, that is, resiliently biased toward contraction, that is, towards a closed circular condition. The gap at the closed ends of the race member 20 formed by the splitting thereof is denoted by the reference character 23. The bias of the race member 20 is such that it tends to close the gap 23. However, resiliency of the race member 20 is such that it may be forcibly expanded so as to widen the gap 23 and thus to enlarge both the inner and outer circumference of the race member 20.

The race member 20 has a raceway of annular groove 21 extending circumferentially around the inner wall thereof. This raceway 21, like the raceway 16, has a contour complementing the spherical surface of the balls 19 and is adapted for the rolling engagement of the balls 19 in the raceway 21 in the usual manner. There are lands or ridges 22 on the opposite axial sides of the raceway 21 which lands 22 extend radially inward more than the bottom wall of the raceway 21.

The apparatus for assembling the ball bearing device in FIGURES 1, 2, 3 and 4 includes a fixed centrally disposed support 25 which supports the inner race member 15 in a generally horizontal plane as illustrated. A centering pin 28 carried by the end of the support 25 engages in the bore 17 of the inner race member 15 so as to orient the inner race member in proper position. On the upper end of the support 25, there is an annular flange portion 25A protruding therefrom for aiding in the support of the balls 19 during the assembly operation.

Surrounding and concentrically disposed around the support 25 is a shell or cylinder 26 also in fixed position. As shown, the shell 26 is spaced radially outward from the support 25. A movable collar 27 is mounted concentrically around the support 25 and within the shell 26. The collar 27 is movable in an axial direction relative to the support 25 and shell 26 and, as seen, the support 25 and shell 26 guide the collar 27 in its axial movement. The shell 26 has an inner shoulder 26A and the collar 27 has an outer shoulder 27A, which shoulders are aligned to abut each other. The shoulders 26A and 27A thus limit upward movement of the collar 27.

Positioned below and engaging the collar 27 is a coil spring 30 which is so anchored and biased as to resiliently urge the collar 27 upwardly, that is, toward its position shown in FIGURE 1. The collar 27 has an inner inclined shoulder 27B which acts as a funnel or guide for moving the balls 19 radially inward toward the raceway 16 upon the balls 19 being dropped down into the open end of the collar 27 when the inner race member 15 is in position but with the outer race member 20 not yet in the position shown in FIGURE 1.

The apparatus includes a punch or pressing tool 29 which is so mounted and operated by a pressing mechanism as to forcefully move the punch 29 downwardly in an axial direction toward the support 25 and shell 26. The punch 29 has an annular flange 29A extending therearound which is dimensioned and shaped to engage the top surface of the outer race member 20 when disposed in a generally horizontal plane and parallel to the plane of the inner race member 15.

In the assembly of the ball bearing device with the apparatus illustrated in FIGURES 1 to 4, inclusive, the nest is in the position shown in FIGURE 1 wherein the collar 27 is in its upper position. The inner race member 15 is placed upon the top of the support 25 and over the centering pin 28 as shown. The required number of balls 19 are then introduced into the annular space between the collar 27 and the inner race member 15. The inclined shoulder 27B funnels the balls 19 downwardly and around to form a circle of balls located in the raceway 16 as shown in the drawing. Next the split outer race 20 in its contracted condition is placed downwardly upon the circle of balls 19 to the position shown in FIGURE 1. It is to be noted that the lower inner edge of the outer race member 20 engages the surface of the balls at locations which are radially outward of a reference cylinder coinciding with the centers of the plurality of balls. When so arranged, the outer round surface of the balls provides a camming surface for forcefully expanding the outer race member 20 upon the outer race member 20 being forcefully moved downwardly against the balls. The flange portion 25A aids in supporting the balls in position. The raceway 16, the flange portion 25A and the inclined shoulder 27B together cooperate to retain the balls 19 in the position shown in FIGURE 1.

The punch 29 is then forcefully moved downwardly in an axial direction to press the outer race member 20 downwardly against the balls 19. The balls 19 cammingly force the outer race member 20 to expand against the resilient bias thereof and to thus clear the balls 19 in the raceway 21 of the outer race member 20. An intermediate step of this downward movement of the outer race member 20 is shown in FIGURE 2 wherein the race member 20 has expanded substantially to the maximum amount required. Further downward movement of the punch 29 presses the outer race member 20 still further from its position shown in FIGURE 2 to its position shown in FIGURE 3. Here the resilient bias of the outer race member 20 toward contraction has caused the outer race member 20 to contract about the balls 19 as soon as the raceway 21 of the outer race member 20 is opposite the raceway 16 of the inner race member 15. In FIGURE 2 the balls 19 have engaged the inclined shoulder 27B but to make room for the outer race member 20 to move down and around the balls 19, it is necessary that the collar 27 move downwardly sufficiently to accommodate the outer race member 20 around and below the balls 19. The resilient bias of the coil spring 30 is such as to cause the collar 27 to yield to downward pressure of the punch 29 against the outer race member 20 which in turn presses downwardly upon the shoulder 27B. The position of the collar 27 on its downward position is illustrated in FIGURE 3.

Upon the raising of the punch 29 upwardly and out of the way, the resilient bias of the spring 30 tends to raise the outer race member 20 and with it the balls 19 and inner race member 15. The thus assembled ball bearing device may be removed from the nest and is ready for later use or assembly with the parts with which it is to be associated. With the punch 29 raised and up out of the way, the parts of the nest resume the position shown in FIGURE 1 and another cycle of assembly may be instituted and the operation as described repeated.

In the assembly operation illustrated in connection with FIGURES 5 and 6, there is utilized an apparatus including a fixed cylindrical support or shell 31 to which is fixedly connected or mounted a sleeve support 32, parts 31 and 32 being joined together. Mounted axially within the shell 31 and sleeve 32 is a support 34. This support 34 is resiliently biased upwardly by a coil spring 35. The support 34 has an outer shoulder 34A axially aligned with an inner shoulder 32A of the sleeve 32, whereby the shoulders 32A and 34A may abut to limit upwardly movement of the movable support 34 within the sleeve 32.

The shell 31 has an annular recess 31A at its upper end for accommodating therein an outer race member 20, the diameter of the annular recess 31A being substantially greater than the maximum outer diameter of the outer race member 20 even in its expanded condition. The sleeve 32 has an annular flange 32B extending upwardly therefrom as illustrated for aiding in the support of the balls 19 arranged in a circle in the raceway 21 of the outer race member 20, the flange 32B protruding upwardly into the annular recess 31A. There is provided in the apparatus a punch or pressing tool 33 movable axially downwardly toward the nest made up of parts 31, 32 and 34. This punch 33 has a nose portion 33A adapted to complementarily enter the upper end of the bore 17 of inner race member 15.

Figure 6:
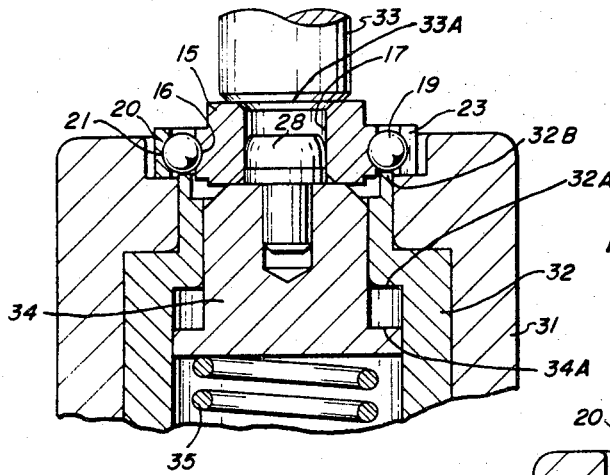
FIGURE 6 is a view somewhat like that of FIGURE 5 but showing the parts thereof in a later stage of the assembly operation.

In the assembly of the bearing device in association with the apparatus of FIGURES 5 and 6, the nest is arranged wherein the support 34 is in its upper position as shown in FIGURE 5. The outer race member 30 is then positioned in its contracted condition within the annular recess 31A so as to dispose the outer race member 20 in a generally horizontal plane as illustrated. Prior to the positioning of the inner race member 15 over the support 34, the required number of balls 19 are introduced into the raceway 21 of the outer race member 20. The inclined or tapered surface 34B at the upper end of the support 34 helps funnel the balls 19 downwardly and outwardly to form a circle of balls in the raceway 21 of the outer race member 20. The inclined surface 34B, the annular flange 32B and the raceway 21 together aid in supporting the plurality of balls 19 in the circular arrangement within the raceway 21. After the balls are introduced to their position shown in FIGURE 5, then the inner race member 15 is positioned upon the top of the raised support 34, the centering pin 28 holding the inner race member 15 in proper axial alignment with the outer race member 20. Thereafter, the punch 33 is moved downwardly to engage the top of the inner race member 15 and further forcefully moved downwardly to press the inner race member 15 down to within the circle of balls 19 and concentrically of the outer race member 20. Upon the lower and outer annular edge of the inner race member 15 engaging the surface of the balls 19 at locations radially inward of a reference cylinder coinciding with the centers of the circle of balls, the balls 19 are cammingly urged radially outward as the inner race member descends. This forced radial outward movement of the balls 19 forcefully expands the outer race member 20 sufficiently to enable the lower land 18 of the inner race member 15 to clear the balls 19 and thus permit the raceway 16 to be disposed opposite the raceway 21 at which location the balls 19 are positioned within the opposed raceways 16 and 21 as shown in FIGURE 6. Upon reaching this position wherein the balls are accommodated in the opposed raceways, the outer race member 20 resiliently contracts around the balls 19 and the parts of the bearing device assume the position shown in FIGURE 6.

To accommodate the downward movement of the inner race member 15 relative to the outer race member 20, the support 34 yields so as to move downwardly from the position shown in FIGURE 5 to the position shown in FIGURE 6. This yielding is resiliently opposed by the resilient bias of the coil spring 35 urging the support 34 upwardly. Upon the punch 33 being raised and up out of the way, the bias of the spring 35 tends to raise the support 34, the support 34 in turn raises the inner race member 15 and with it the balls 19 and outer race member 20. The assembled bearing device may then be removed from the nest and the cycle of operation again started by placing another inner race member 15 upon the top of the raised support 34.

Figure 7:
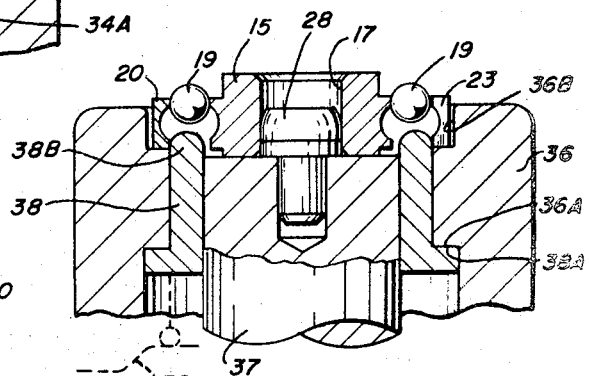
FIGURE 7 is a longitudinal sectional view through still another modified form of apparatus illustrating another manner of assembling a ball bearing device having a split outer race resiliently biased toward contraction.
Figure 8:
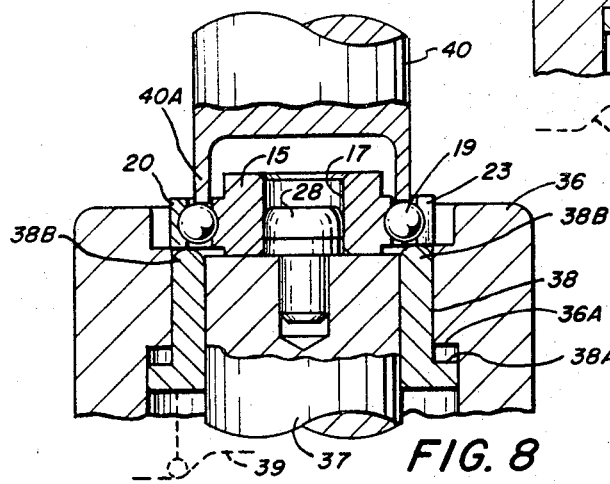
FIGURE 8 is a view somewhat like that of FIGURE 7 but showing the parts in a later stage of the assembly operation.

A still further manner of assembling the ball bearing device having the split outer race resiliently biased toward contraction is illustrated in FIGURES 7 and 8. In the apparatus of FIGURES 7 and 8, there is fixed cylindrical support or shell 36 and a fixed support 37 concentrically mounted within the shell 36. A movable collar 38 is concentrically mounted around the support 37 and within the shell 36, the opposed walls of parts 36 and 37 guiding the movement of the collar 38 axially of the nest made up of parts 36, 37 and 38. For moving the collar 38 in an axial direction in the required sequence of steps, there is provided a mechanism 39 which actuates the collar 38. This mechanism 39 is illustrated diagrammatically in the drawing as a camming mechanism which is arranged to raise the collar 38 to its position shown in FIGURE 7 and to lower the collar 38 to its position shown in FIGURE 8. Shell 36 has an inner shoulder 36A and the collar 38 has an outer shoulder 38A disposed in axial alignment so as to abut and limit the upward movement of the collar 38 to the relative position of the parts shown in FIGURE 7.

The upper end portion 38B of the collar 38 is rounded so as to provide a tapered camming surface engageable with the lower inner edge portion of an outer race member 20. The taper or shape of the upper edge portion 38B of the collar 38 is such as to forcefully cause the outer race member 20 to expand upon the movement of the collar 38 upwardly into the gap between the concentric inner and outer race members. As seen in FIGURE 7, upon the collar 38 being in its upper position, the outer race member 20 supported by the shell 36 in the annular recess 36B thereof is forced to expand and is maintained in the expanded condition by the upper edge portion 38B of the collar 38.

In the assembly of the bearing device in the manner illustrated in FIGURES 7 and 8, the inner race member 15 is placed upon the support 37 with the centering pin 28 in the bore 17 of the inner race member 15. The outer race member 20 is placed down in a horizontal plane in the annular recess 36B where it is supported by the shell 36. One alternative way of expanding the outer race member is to have the collar 38 positioned upwardly and to force the outer race member 20 down over the upper edge portion 38B of the raised collar 38 and thus cammingly force the race member to expand. Another alternative way is to hold the outer race member 20 downwardly on the shell 36 and then to have the collar 38 forcibly raised upwardly by the mechanism 39, thus forcibly causing the upper edge portion 38B to rise upwardly in the gap between the race members and to thus cammingly force the outer race member 20 to expand. The outer race member 20 is shown expanded in either manner in FIGURE 7. The plurality of balls 19 are then arranged in a circle at the upper gap between the concentric race members as shown in FIGURE 7. Here the opposed upper lands of the race members tend to frictionally engage the balls 19 if the outer race member is not sufficiently expanded. If the outer race member is sufficiently expanded, then the balls 19 may fall down within the opposed raceways to form a circle of balls resting on the top of the upper edge portion 38B of collar 38.

To overcome any resistance encountered by the balls entering the gap between the concentric race members, and to force the balls 19 downwardly to a location intermediate the opposed raceways of the race members, the punch 40 is moved downwardly. The punch 40 has an annular flange portion 40A arranged to engage the top surfaces of the circle of balls 19 and to forcibly push the balls downwardly from the position shown in FIGURE 7 to the position shown in FIGURE 8. To allow the outer race member to contract around the balls 19, it is necessary to withdraw the collar 38 so as to remove the upper edge portion 38B from within the outer race member 20. This withdrawal may be effected by the mechanism 39 operatively connected to the collar 38 so as to move the collar 38 downwardly as the punch 40 moves downwardly and as the outer race member 20 contracts about the balls 19 as shown in FIGURE 8. After the punch 40 is raised and up out of the way, then the assembled bearing device may be removed from the nest and the cycle of operation repeated by placing another inner race member 15 on the support 37 and another outer race member 20 in the annular recess 36B.

A still further process and apparatus used for assembling ball bearing devices having the split outer race resiliently biased toward contraction is illustrated in FIGURES 9 to 13, inclusive. The bearing device illustrated in connection with this later form of apparatus and process has two circles of balls and hence two sets of opposed raceways. Inner race member 42 has two raceways 43 and 44 axially spaced from each other around the annular surface of the inner race member 42. There are two sets of balls 45 each set being arranged in a circle within opposed raceways of the respective race member. The outer race member 46 has raceways 47 and 48 axially spaced from each other along the inner wall of the outer race member 46. In the bearing device illustrated, it is desired that the raceways 43 and 44 of the inner race member 42 are somewhat deeper than are the raceways 47 and 48 of the outer race member 46.

The apparatus utilized in this process of assembly has a fixed cylindrical support or shell 49 and positioned axially of the shell 49 is a central support 50. This support 50 is movable in an axial direction within the shell 49. Mounted concentrically around the support 50 and within the shell 49 is a collar 52 which collar 52 is also movable axially within the shell 49. The collar 52 has an outer shoulder 52A axially aligned with an inner shoulder 49A of the shell 49, which shoulders upon abutment limit upward movement of the collar 52 to its position shown in FIGURE 9. A coil spring 53 positioned under the collar 52 and engaging the collar, and suitably anchored, is resiliently biased to resiliently urge the collar 52 upwardly toward its position shown in FIGURE 9. A mechanism is preferably provided for moving the support 50 axially relative to the shell 49 during the sequence of steps in the operation. This mechanism is illustrated diagrammatically as a camming mechanism 51 so arranged and operatively connected to the support 50 as to move the support 50 through the steps of operation herein described.

Figure 9:
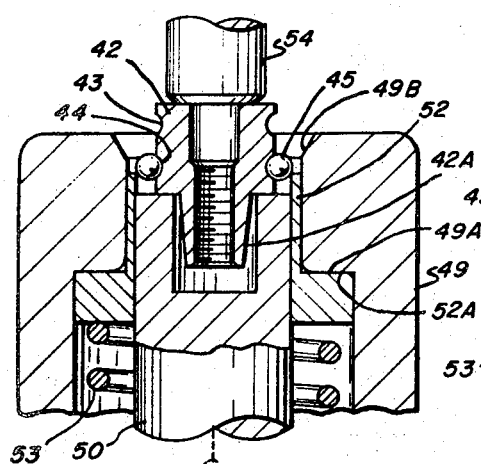
FIGURE 9 is a longitudinal sectional view of still another modified form of apparatus illustrating the assembling of a ball bearing device having a split outer race resiliently biased toward contraction.

The assembly of the bearing device is commenced with the nest in its position illustrated in FIGURE 9, that is, wherein the collar 52 is in its uppermost position and the support 50 is in its uppermost position. An inner race member 42 is positioned upon the support 50 so as to locate the stem portion 42A of the inner race member 42 within a centering recess in the support 50. With the inner race member 42 thus in its position shown in FIGURE 9, a plurality of balls 45 sufficient in number to complete one circle of balls in a raceway is introduced to the nest. The inclined surface 49B of the shell 49 tends to funnel the balls 45 downwardly and around in a circle to position the balls 45 in the lower raceway 44. The raceway 44 together with the upper edge portion of the collar 52 supports the balls 45 in the position shown. A first punch 54 dimensioned to engage only the top of the inner race member 42 is then forcibly brought downwardly in an axial direction so as to press the inner race member 42 downwardly from its position shown in FIGURE 9 to its position shown in FIGURE 10. To accommodate the downward movement of the inner race member 42, the support 50 is concurrently moved downwardly by the mechanism 51. This forced downward movement of the inner race member 42 forces the first course or circle of balls within the raceway 44 downwardly to within the collar 52. Thus the collar 52 acts to confine the balls 45 and to retain them in the lower raceway 44. While the inner race member 42 in its position shown in FIGURE 10, another set of balls 45 is introduced in the same manner so as to form another circle of balls in the upper raceway 43 at the top of the collar 52. Further downward movement of the punch 54 forces the inner race member 42 still further downward to its position shown in FIGURE 11 wherein both circles or courses of balls 45 are confined within the collar 52 and maintained within the respective raceways 44 and 43. The mechanism 51 has correspondingly moved the support 50 downwardly to accommodate for the further downward movement of the inner race member 42.

Figure 11:
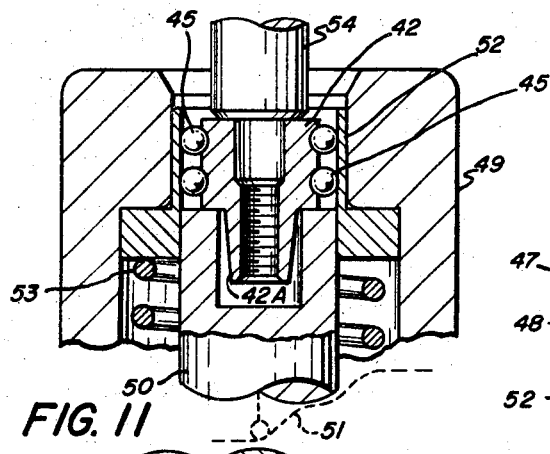
FIGURE 11 is a view somewhat like that of FIGURE 9 and 10 but showing a still later stage of the assembly operation.

With the parts positioned as shown in FIGURE 11, the punch 54 is raised and moved out of the way. Then the outer race member 46 is placed on top of and in axial alignment with the collar 52. A second punch 55 having an annular flange portion 55A on its lower end is then moved downwardly so as to press the flange portion 55A downwardly upon the top surface of the outer race member 46. The initial downward movement of the second punch 55 causes the outer race member 46 to be cammingly forced against the outer round surface of the balls 45 and thus to forefully expand the outer race member 46 from its normally contracted condition to its expanded condition shown in FIGURE 12. The mechanism 51 maintains the support 50 in the operation shown in FIGURE 12 at its same relative position as shown in FIGURE 11. However, the coil spring 53 has permitted the collar 52 to move downwardly in the shell 49 so as to accommodate the downward movement of the outer race member 46 within the shell 49, which outer race member 46 has pushed the collar 52 downwardly against the bias of the spring 53.

Figure 10:
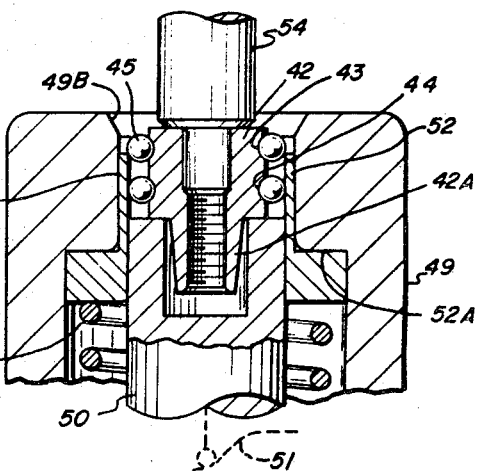
FIGURE 10 is a view somewhat like that of FIGURE 9 but showing a later stage of the assembly operation.
Figure 12:
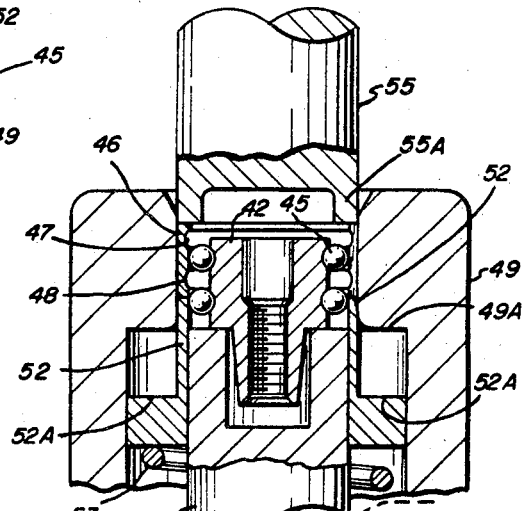
FIGURE 12 is a view somewhat like that of FIGURES 9, 10 and 11 but showing a still later stage of the assembly operation.
Figure 13:
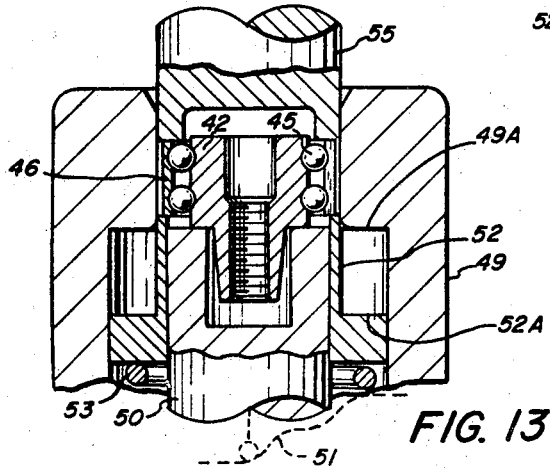
FIGURE 13 is a view somewhat like that of FIGURES 9, 10, 11 and 12 but showing a still later stage of the assembly operation.

The punch 55 is progressively pushed further downwardly from its position illustrated in FIGURE 12 to its position illustrated in FIGURE 13. Here the outer race member 46 is moved downwardly so that the respective raceways of the race members are disposed in opposition to each other whereby the balls 45 of each circle of balls enter the opposed raceways of the inner and outer race members. When in this location, the outer race member 46 resiliently contracts about the balls 45 so as to firmly hold the balls 45 in their respective raceways. This location of the balls and the contracted condition of the outer race member 46 is illustrated in FIGURE 13. To accommodate for the further downward movement of the outer race member 46 from its position shown in FIGURE 12 to its position shown in FIGURE 13, the spring 53 has been further compressed by the forced downward movement of the collar 52 and by the downward movement of the outer race member 46 against the top of the collar 52. Upon the parts of the bearing device reaching the condition illustrated in FIGURE 13, the bearing device is assembled. The punch 55 is then raised and moved out of the way, the support 50 is moved upwardly by the mechanism 51, and the collar 52 is raised upwardly by the spring 53. The assembled bearing is then ready to be removed from the nest. The nest is then ready for beginning another cycle of operation for the assembly in like manner of another bearing device. It is to be noted that the mechanism 51 progressively moves the support 50 from its raised position shown in FIGURE 9 to its position shown in FIGURE 10, thence to its lower position shown in FIGURES 11, 12 and 13. It is also be noted that the collar 52 moves from its raised position where it is supported by the spring 53 as shown in FIGURES 9, 10 and 11 and then the collar 52 moves downwardly through its position shown in FIGURE 12 to its lower position shown in FIGURE 13. Thereafter the support 50 and collar 52 rise again to their original positions shown in FIGURE 9 for commencement of another cycle of assembly operation.

It is to be noted that by the unique apparatus and novel process described in connection with the several figures, bearing devices of this type may be rapidly, efficiently and economically assembled.

The present disclosure includes that contained in the appended claims, as well as that of the foregoing description.

Although this invention has been described in its preferred form and preferred practice with a certain degree of particularity, it is understood that the present disclosure has been made only by way of example and that numerous changes in the details of construction and the combination and arrangement of parts and steps may be resorted to without departing from the spirit and scope of the invention as hereinafter claimed.

What is claimed is:

1. Apparatus for assembling into a bearing device an inner race member, a plurality of balls, and a split outer race member resiliently biased toward contraction, comprising in combination a nest structure having a central support for said inner race member, a shell concentrically mounted about said central support and having a funnel wall leading toward said central support for funneling said balls into a circle in the raceway of the inner race member on said central support, a collar concentrically mounted within said shell and about said central support, said collar being axially movable relative to the shell to be positionable about the balls in the raceway of said inner race member and to be withdrawn from about said balls, and a punch member for pressing said outer race member downwardly in axial alignment with said collar to replace the same about said balls and to press the outer race member down and around said balls to expand the outer race member for clearing said balls until the raceway of the outer race member is opposite the raceway of the inner race member in which the balls are located and the outer race member contracts about said balls.

2. Apparatus as claimed in claim 1 and including resilient means resiliently urging said collar upwardly and opposable by the outer race member being pressed downwardly on the collar by said punch member, and means for moving said inner race member and central support supporting the same downwardly in said nest structure to a position to locate the balls within said collar prior to replacement of the collar by said outer race member.

3. Apparatus for assembling into a ball bearing device an inner race member, a plurality of balls, and a split outer race member resiliently biased toward contraction, comprising support means for supporting the inner race member in a generally horizontal plane, funnel means concentrically mounted about said support means and positioned to surround said inner race member for funneling said balls into a circle in the raceway of said inner race member, collar means concentrically mounted about said support means and movable axially relative thereto for confining said balls in the raceway of said inner race member, first pressing means engageable solely with the inner race member supported on said support means for pressing the inner race member and balls disposed in the raceway thereof into said collar means, and second pressing means engageable solely with the said outer race member for pressing said outer race member in an axial direction relative to said support means against said collar means to replace the same about said balls and for concurrently pressing the outer race member against said balls to cammingly expand said outer race member for clearing said balls sufficiently to allow the outer race member to contract about the balls in oppositely disposed raceways of said race members.

4. Apparatus as claimed in claim 3 and including first means operatively connected to said support means providing for the concurrent withdrawal of the said support means in the nest structure as the first pressing means presses the inner race member and said balls in the raceway thereof into said collar means, and second means operatively connected to said collar means providing for the concurrent withdrawal of the collar means in the nest structure as the second pressing means presses the outer race member in an axial direction against said collar means to replace the same about said balls.

5. Apparatus for assembling into a ball bearing device an inner race member, a plurality of balls, and a split outer race member resiliently biased toward contraction, comprising the combination of first means disposable concentrically about said inner race member for introducing the balls into a raceway of the inner race member, second means disposable concentrically of the inner race member and disposable about said balls for confining the balls in said raceway, third means movable axially of the inner race member and engageable with said outer race member for progressively replacing said second means about said balls with said outer race member and concurrently expanding the outer race member over said balls by being forced against the surface of said balls as the second means is replaced, whereby the outer race member may contract about said balls upon the raceway of the outer race member being disposed opposite the race way of the inner race member holding said balls, said first, second and third means being disposed in a nest arrangement accommodating the ball bearing device being assembled.

References Cited
UNITED STATES PATENTS

| | | | |
|---|---|---|---|
| 2,648,578 | 8/1953 | Stearns et al. | 308—196 |
| 2,702,216 | 2/1955 | Stearns | 29—148.4 X |
| 2,741,826 | 4/1956 | Hall | 29—453 X |
| 3,116,543 | 1/1964 | Schoos | 29—201 |

THOMAS H. EAGER, *Primary Examiner.*